March 29, 1932.     J. E. TYLER     1,851,604
ALL METAL SANITARY PARTITION
Filed April 19, 1930     2 Sheets-Sheet 1
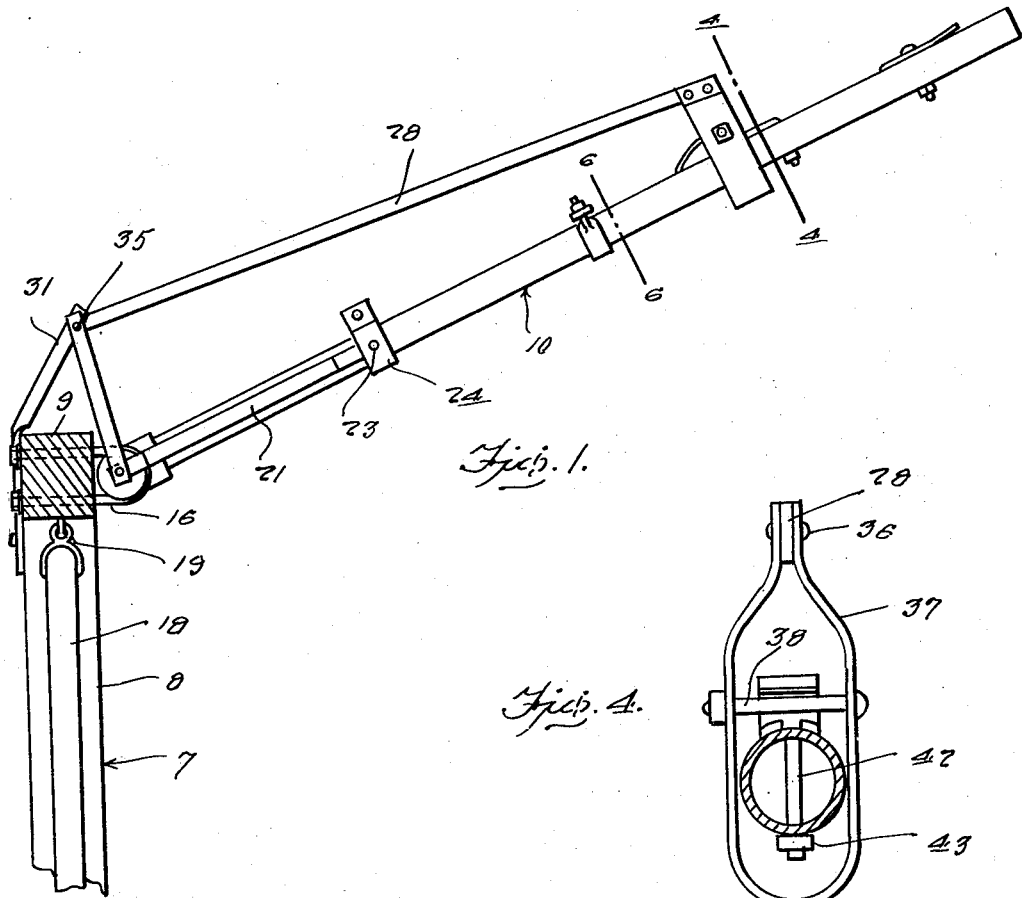
Fig. 1.
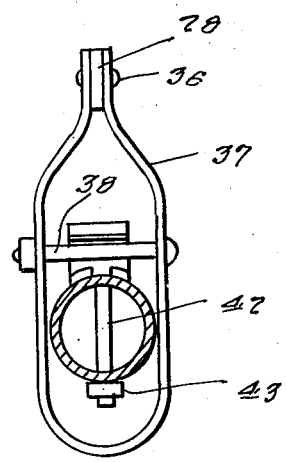
Fig. 4.
Fig. 5.
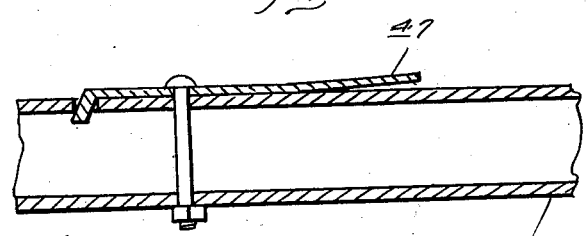
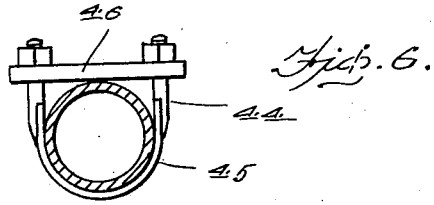
Fig. 6.
Inventor
Jesse E. Tyler
By Clarence A. O'Brien
Attorney March 29, 1932.   J. E. TYLER   1,851,604
ALL METAL SANITARY PARTITION
Filed April 19, 1930   2 Sheets-Sheet 2

Fig. 2.

Fig. 3.

Inventor
Jesse E. Tyler

By Clarence A. O'Brien
Attorney

Patented Mar. 29, 1932

1,851,604

UNITED STATES PATENT OFFICE

JESSE E. TYLER, OF WORCESTER, NEW YORK

ALL METAL SANITARY PARTITION

Application filed April 19, 1930. Serial No. 445,676.

This invention relates to stalls, and more particularly to cow stalls.

An object of the invention is to provide a partition for stalls that permits the cattle to be positioned within the stall with ease and dispatch and at the same time will remain supported in any position so that the stalls may be cleaned with ease and economy.

Further objects of the invention are to provide a partition of the character referred to that is strong, compact and durable, thoroughly reliable for its intended purpose, very simple in its method of assembly, formed of all metal parts, so as to be sanitary, and that is comparatively inexpensive to manufacture and install.

With the foregoing and other objects in view, the invention consists of a novel construction, combination and arrangement of parts as will be hereinafter more specifically described and illustrated in the accompanying drawings, wherein is disclosed an embodiment of the invention, but it is to be understood that changes, variations and modifications and amendments may be resorted to without departing from the spirit of the claim hereto appended.

In the drawings wherein like reference characters denote corresponding parts throughout the several views:

Figure 1 is a side elevation of the invention applied to the stanchion support which is shown in vertical detailed section, Fig. 2 is a view similar to Fig. 1 showing the partition in down or closed position for dividing the cows from one another, Fig. 3 is a top plan view thereof in the down position, Fig. 4 is a detailed vertical section taken substantially on the line 4—4 of Fig. 1, Fig. 5 is a longitudinal fragmentary section of the partition bar, taken substantially on the line 5—5 of Fig. 3, and Fig. 6 is a detail vertical section through the partition arm, taken substantially on the line 6—6 of Fig. 1.

In the drawings, wherein for the purpose of illustration is shown the preferred embodiment of my invention, 7 indicates generally the stanchion frame that is disposed vertically at the forward end of a battery of stalls.

This stanchion frame 7 forms the transverse forward partition of a battery of stalls, divided longitudinally by the device in accordance with the present invention. This stanchion frame consists of a plurality of vertical uprights 8 anchored at their lower ends to the stable floor, and across the tops of the uprights there is secured a horizontal cross rail 9 which is preferably formed of wood, but may be made of any desired metal.

The partition arm is indicated generally at 10 and consists of an elongated piece of metal.

The arm 10 is mounted to rock vertically at right angles to the stanchion support 7. On the forward end of the arm 10 is a T-shaped fitting 11 to the stem of which is threadably connected the forward end of the arm. Lateral extensions 12, 13 are threadably connected to the branches of the T-shaped fitting 11 and on the outer ends of these extensions are secured the outstanding collars 14, 15.

Bearing against the inner end of the collars 14, 15 are the bight portions of the U-shaped bolts 16, 17 the legs of which are anchored to the top rail 9 of the stanchion support. Thus it will be seen that the arm is rockable in the bight portion of the clamping bolts.

The bight of the stanchion 18 is swiveled as at 19 to the under side of the cross arm and there is one stanchion and one partition arm 10 for each stall.

Long bolts extend through the fitting 11, the branches and the collars which are hollow tubes, and extend free of the outer end of the collars 14 and 15. This bolt 20 extends through apertures on the outer ends of horizontal diagonal supporting arms 21, 22 disposed on the opposite sides of the arm 10. On the inner ends of the arms are secured as at 23, a clamping ring 24, that is disposed about the intermediate portion of the partition arm 10. The ring 24 is formed of a single strap of metal with vertical extensions 25, 26, on the ends that are provided with apertures to receive the bolt 27 that secures the plate about the arm 10.

An elongated latch rod 28 is mounted above the partition arm 10.

A pair of upstanding arms 29, 30 are pivoted at their lower ends to the outer ends of the bolt 20. An upstanding strap 31 is bolted at its lower end as at 32 to the upright 8 and this strap inclines rearwardly and terminates in alinement with the upstanding ears 33, 34, on the upper ends of the arms 29, 30.

The inner end of the latch rod 28 also terminates between these ears, and a single bolt 35 extends through alined apertures in the ears, the upper end of the strap 31 and the outer end of the latch rod 28, whereby a rocking bearing is provided for a latch rod 28.

On the inner end of the latch rod 28 is secured by means of the rivet 36, the upper end of a looped rod of metal 37 that is circumposed about the arm 10 intermediate its ends. Anchored to the sides of the loop 37 and extending across the opening thereof, is a latch bolt 38, and this loop 37 is adapted to slide on the partition bar 10 when it is rocked up and down on its pivot.

Adjacent the outer end of the arm 10, there is an upstanding latch indicated generally at 39 and this latch is formed of a flat piece of metal bent intermediate its ends to form a transverse pocket 40 and an arcuate forward portion 41, the end of which is anchored in an opening in the arm 10.

The outer end of the latch 39 is formed with an integral bolt 42 that extends through openings in the arm 10 and is rigidly secured by means of a nut 43 on its lower end. A stop member is indicated generally at 44 and consists of a clevis bolt 45 disposed about the lower portion of the arm 10 and across the legs of the clevis bolt there is secured a strap 46 that projects laterally of the arm 10.

The loop 37 on the end of the latch arm 28 is adapted to slide between the latch 39 and the stop member 44 and it will be understood that the stop member 44 may be adjusted lengthwise of the arm 10 to fix the limit of downward movement of the arm.

Adjacent the outer end of the arm 10, there is secured a spring clip 47 in which the cow's tail may be clipped while the cow is being milked.

In the operation of the rockable partition arm, it will be understood that the arm is in the down position as shown in Fig. 2 of the drawings. In this position the loop 37 bears against the stop member 44 and is supported in a downwardly inclined position to provide a partition between the cows which are held by the stanchion 18.

To raise the arm 10, all that is necessary to be done, is to lift upwardly on the arm whereupon the loop 37 will slide outwardly on the arm and the bolt will ride over the curved portion 41 of the latch and seat in recess or pocket 40, whereupon the arm will be supported in the position shown in Fig. 1 of the drawings.

To release the partitions, all that is necessary to be done, is to press upwardly on the loop 37 to move the arm up slightly to free the bolt 37 of the pocket 40 until it clears the outer face of the latch, whereupon the arm may be released to permit it to move downwardly under the action of gravity and then the loop will slide inwardly on the arm until it engages the stop member 44 and this engagement of the member 44 by the loop of the machine, will hold the arm 10 in its lowered position.

The present embodiment of the invention has been disclosed in considerable detail merely for the purpose of exemplification, since in actual practice it attains the features of advantage enumerated as desirable in the statement of the invention, and the above description.

It is to be understood that by describing in detail herein any particular form, structure or arrangement, it is not intended to limit the invention beyond the terms of the claim, or the requirements of the prior art.

Having thus described my invention, what I claim as new is:

A device of the character described comprising a forward transverse partition, a longitudinal partition bar pivotally connected at its forward end to the said partition, a latch rod associated with the transverse partition at one end, an elongated loop member connected at its upper end to the rear end of the latch rod and through which the bar passes, an adjustable stop on the bar in front of the loop for engagement thereby to limit downward movement of the bar, said stop consisting of a U-member embracing the bar, and a strap having holes therein through which the ends of the limbs of the U-member pass, with nuts on the ends of the limbs for holding the strap and U-member in clamping engagement on the bar, a latch on the bar in rear of the loop and a bolt on the loop for engagement with the latch to hold the bar in raised position.

In testimony whereof I affix my signature.

JESSE E. TYLER.